United States Patent [19]

Kulik

[11] 4,212,051
[45] Jul. 8, 1980

[54] ANTI-ROTATIONAL LAMP ASSEMBLY

[75] Inventor: George J. Kulik, Valley Stream, N.Y.

[73] Assignee: Abex Corporation, New York, N.Y.

[21] Appl. No.: 920,930

[22] Filed: Jun. 30, 1978

[51] Int. Cl.² ........................................... F21V 21/14
[52] U.S. Cl. ................................. 362/287; 362/278; 362/306; 362/322; 362/369; 362/436
[58] Field of Search ............... 362/277, 278, 282, 284, 362/285, 287, 306, 369, 322–324, 389, 433–438, 440, 288, 320

[56] References Cited

U.S. PATENT DOCUMENTS

| | | | |
|---|---|---|---|
| 215,656 | 5/1879 | Nicholson | 362/322 |
| 1,703,599 | 2/1929 | Saylor | 362/378 |
| 2,067,722 | 1/1937 | Mead et al. | 362/324 |
| 2,142,458 | 1/1939 | Rusch | 362/322 |
| 2,749,434 | 6/1956 | Falge | 362/306 |
| 3,065,340 | 11/1962 | Mead et al. | 362/369 |
| 4,163,276 | 7/1979 | Tabatchnik-Michael | 362/306 X |
| 4,164,012 | 8/1979 | Gulliksen | 362/282 |

*Primary Examiner*—Peter A. Nelson
*Attorney, Agent, or Firm*—Blum, Kaplan, Friedman, Silberman & Beran

[57] ABSTRACT

An anti-rotational lamp assembly for a vehicle including a grommet and cooperating lamp housing. The assembly includes an elastomeric grommet formed with radial ribs for compressive mounting in a wall opening and a lamp housing formed with a plurality of radial ribs for compressive engagement between the lamp housing and the inner surface of the grommet for preventing rotation of a mounted assembly due to road shock and vibration.

10 Claims, 3 Drawing Figures

ANTI-ROTATIONAL LAMP ASSEMBLY

BACKGROUND OF THE INVENTION

This invention relates generally to an improved vehicle lamp assembly, and particularly to an improved anti-rotational lamp construction for an automotive vehicle lamp assembly. Automotive vehicles, and particularly commercial vehicles, are subjected to recurrent road shocks in traveling over the highway. These road shocks, transmitted through the frame of the vehicle, affect the relatively fragile filaments of the lamp bulbs in the marker, signalling and driving lamps of the vehicle, so that such bulbs frequently break or become inoperative due to the road shocks. Thus, the lamp bulbs must be replaced at rather frequent intervals. With some types of lamps, such replacement is difficult for the driver of the vehicle to perform on the road. In addition, the driver is often unaware that the lamp bulbs on his vehicle have broken, or the lamps are inoperative, as his opportunity for observing the lamp condition occurs only when the vehicle is stopped, as at a rest area or during a change of drivers.

In order to facilitate replacement of a damaged lamp, the industry has adopted sealed lamp housings which are replaced instead of the bulbs. In some cases it is desirable to have a lamp housing which can be installed in the vehicle without requiring screws or other fastening means. Rubber grommets for compressively engaging the sealed housing have been adopted for some applications, but under severe road vibration may cause rotation of the grommet and/or housing relative to the vehicle wall. This rotation subjects the electrical lead wires to abuse and increases the likelihood of damage.

Various means have been proposed to overcome this rotation of the automotive vehicle lamp housing. It has been proposed to provide radial ribs on an elastomeric mounting grommet force-fit into a wall opening and a curved lamp housing compressively retained therein. This construction has reduced rotation of the lamp assembly to some extent. However, in actual use undesirable rotation occurs and the grommet must be installed with additional means such as a screw to prevent rotation of the grommet. This has not prevented rotation of the lamp housing within the grommet and this arrangement has proved less than fully satisfactory. Accordingly, it is desirable to provide an anti-rotational lamp construction which will further reduce rotation of an automotive vehicle lamp and which, in addition protects the lead wires from strain. It is also desirable to provide an improved anti-rotational lamp construction which may be more easily constructed, readily assembled and installed in a vehicle than those suggested in the prior art.

SUMMARY OF THE INVENTION

Generally speaking, in accordance with the invention, an improved anti-rotational lamp assembly for use as an automotive vehicle lamp is provided. The anti-rotational lamp assembly includes a grommet formed with a plurality of radial ribs for compressively engaging a mounting opening in a mounting surface and an outwardly extending front and back lip for abutting the front and back surfaces of the mounting surface, respectively. A substantially cup-shaped lamp housing having a plurality of radial ribs formed about the periphery of the housing for compressively abutting the inside wall of the mounted grommet. The radial ribs formed in the lamp housing cooperate with the grommet for securing the rotational position of the grommet in the mounting opening and for securing the position of the housing in the grommet when assembled thereby eliminating the need for any mounting hardware.

Accordingly, it is an object of the invention to provide an improved anti-rotational lamp assembly.

Another object of the invention is to provide an anti-rotational lamp assembly including an improved lamp housing.

A further object of the invention is to provide an improved anti-rotational lamp assembly for use with existing anti-rotational mounting grommets.

Still another object of the invention is to provide an improved anti-rotational lamp assembly of simplified construction suitable for automated manufacture and assembly for further reducing rotation of a vehicle lamp.

Still a further object of the invention is to provide an anti-rotational vehicle lamp assembly which may be installed without fasteners or hardware.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
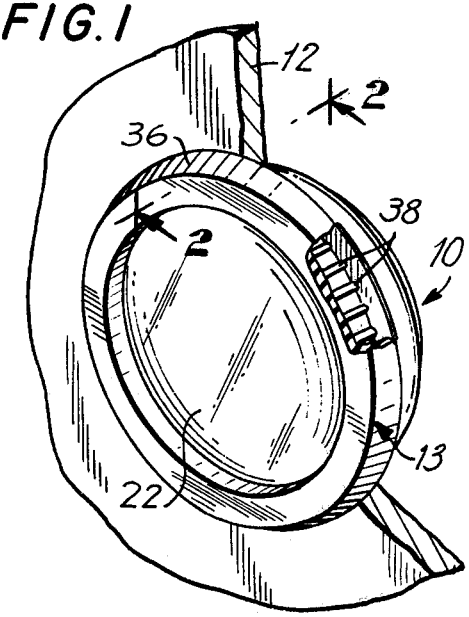
FIG. 1 is a perspective view partially cut-away of an anti-rotational lamp assembly constructed and arranged in accordance with a preferred embodiment of the present invention.
Figure 2:
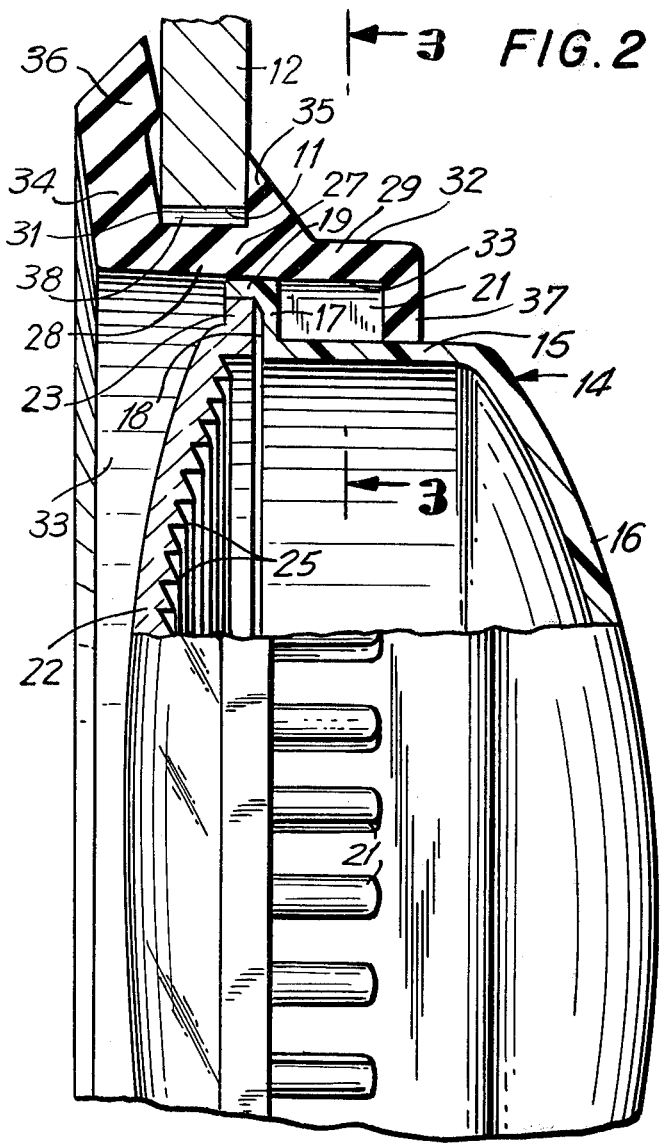
FIG. 2 is a partial cross-sectional view at an enlarged scale taken along line 2—2 of FIG. 1.

Referring specifically to FIGS. 1 and 2, an anti-rotational lamp assembly constructed and arranged in accordance with the invention is shown generally as 10. Assembly 10 is shown mounted in a circular opening 11 formed in a vehicle mounting surface 12 and includes a generally circular mounting grommet shown generally as 13 and a substantially cylindrical cup-shaped housing shown generally as 14 compressably mounted in grommet 13.

Housing 14 is formed with a substantially cylindrical side wall portion 15 and a closed rear wall portion 16. A radially extending flange 17 is formed at the open end or front of side wall 15 and has a seating surface 18 on its front side. An axial cylindrical seating wall 19 is formed along the peripheral edge of flange 17 extending towards the front of housing 14. A plurality of radial ribs 21 are formed about the entire outer circumference on a portion of side wall 15 adjacent to flange 17 for compressably engaging grommet 13 as will be described more fully below.

As shown in FIGS. 1 and 2, a lens 22 is positioned on lens seating flange 18. Lens 22 is generally outwardly convex and is formed with a peripheral seating flange 23 formed about the circumference of lens 22 for cooperating with lens mounting surface 18 and seating wall 19 formed in housing 14. Generally lens 22 is formed with a central bull's-eye (not shown) which may be clear, and the interior portions of the surface of lens 22 surrounding the bull's-eye are formed with a plurality of concentric circular ribs 25 to enhance the refractive property of lens 22. Lens 22 may be sealed in housing 14 in compressive relation between lens mounting surface 18 and seating wall 19 with a sealing gasket (not shown), a sealant or by sonic welding. Lens 22 is often colored red, amber or crystal for use on automotive vehicles, such as trucks, buses and other heavy equipment.

Grommet 13 includes a substantially cylindrical wall 27 having a forward portion 28 and an integral rear portion 29 of smaller cross-section defining a front outer surface 31, a rear outer surface 32 and an inner surface 33 tapered towards the rear. An outwardly extending annular flange 34 is formed on the front end of cylindrical wall 27 and a second flange 35 formed around rear outer surface 32 spaced apart from annular flange 33 for holding mounting surface 12 in vice-like fashion. Annular flange 33 may be formed with a rearwardly facing angular portion 35 for increasing the compressive force against mounting surface 12. Grommet 13 is formed further with an inwardly extending rear annular flange 37 at the rearward end of cylindrical wall 27. Forward outer surface 31 of cylindrical wall 27 in the region between outwardly extending annular flange 33 and second flange 34 is provided with a plurality of radial ribs 38 for abutting the face of circular opening 11.

Representative dimensions will be given for the purpose of illustrating the relationship of the various surfaces and elements of grommet 13 and housing 14. It is to be understood, of course, that the dimensions set forth herein are solely illustrative and not intended to be limiting. In the embodiment illustrated in the drawings, mounting surface 12 is about 0.25 inch thick with circular opening 11 about 4.5 inches in diameter. Grommet 13 to be described, may be used with wall thicknesses ranging from about 0.125 to 0.25 inch.

In grommet 13, side wall 27 has a wall thickness of about 0.16 inch at rear portion 29 with outer surface 32 having an outer diameter of about 4.25 inches which allows rear portion 29 to pass freely through opening 11. The diameter at forward outer surface 31 is about 4.57 inches with the height of each rib 38 about 0.06 inch and about 0.08 inch thick. There are 36 ribs 38, each spaced apart from each other about 0.375 inch from center to center. The outside diameter of grommet 13 at annular flange 34 and angular portion 36 is about 5.25 inches and second flange 35 is spaced apart therefrom about 0.25 inch for gripping surface 12. The diameter of the opening in grommet 13 at the back end of inner surface 33 is about 4.20 inches. Inner surface 33 is about 0.875 inches long with a 5° inward taper for the front 0.6 inch to facilitate insertion of housing 14 into grommet 13. Inwardly extending annular flange 37 is about 0.16 inch thick and forms an opening having a diameter of about 3.1 inches for retaining housing 14 in grommet 13 at the rear end of side wall 15.

Housing 14 is formed with an outside diameter at seating wall 19 of about 4.33 inches and at side wall 15 of about 3.83 inches. There are 44 ribs 21 provided, extending outwardly about 0.22 inch resulting in an outside diameter at the outer surface of ribs 21 of about 4.30 inches. Ribs 21 are about 0.35 inch long with a thickness of about 0.11 inch. Assembly 10 is installed in mounting surface 12 as follows.

Grommet 13 is inserted into circular opening 11 in mounting surface 12 so that mounting surface 12 is gripped between outwardly extending peripheral flange 34 and second flange 35 formed on outer surface 28 of grommet 13. Housing 14 with lens 22 sealed therein is inserted into the opening through grommet 13 and is seated until the backside of ribs 21 engage inwardly extending peripheral flange 37 of grommet 13. At this time, installation of assembly 10 onto mounting surface 12 is completed and the electrical connections (not shown) between housing 14 and the vehicle may be connected.

Figure 3:
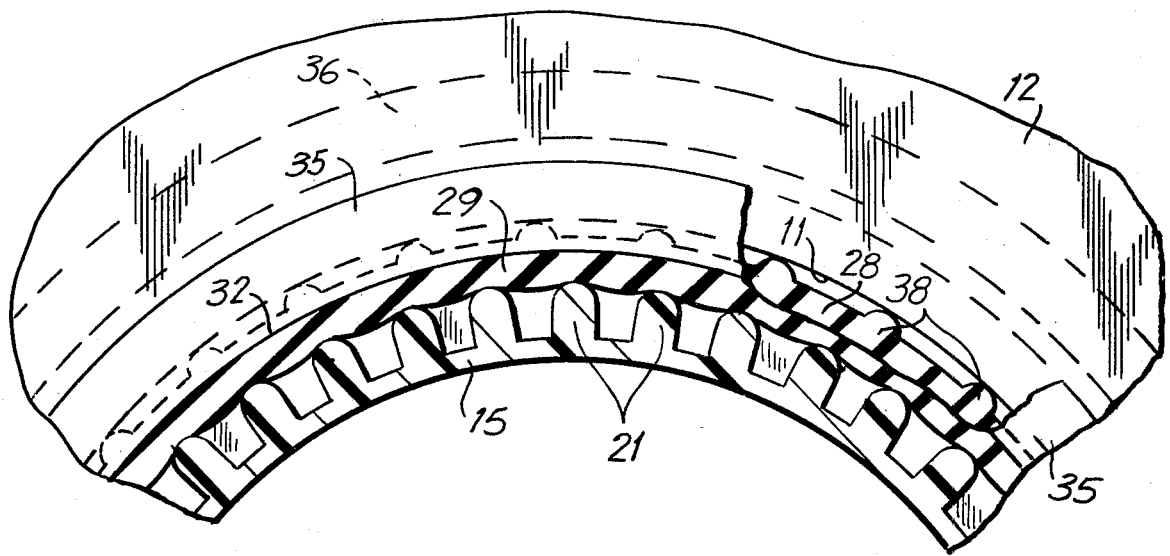
FIG. 3 is a partial rear elevation view of the assembly of FIG. 2.

Referring specifically to FIG. 3, it can be seen that ribs 21 formed on housing side wall 15 and seating wall 19 cooperate with grommet 13 for providing the anti-rotational feature to assembly 10. Inner surface 33 of grommet side wall 27 in the region between axial ribs 21 formed on housing 14 is deformed due to the compressive force of ribs 21 against grommet 13. This forms a deformation gradient along side wall 27 to the region of ribs 38. Additionally, a portion of seating wall 19 is disposed within opening 11, thereby forcing grommet ribs 38 to deform for further insuring an anti-rotational grip between grommet 13 and mounting surface 12.

It has been found that the advantages of the invention may be obtained without the necessity of having ribs 21 and 37 overlapping. For example, as shown in FIG. 2 ribs 21 are completely inserted into opening 11 into compressive relation with rear portion 29 of grommet 13 behind the back wall of mounting surface 12. Notwithstanding this lack of overlap, it has been found that ribs 21 cooperate with ribs 38 of grommet 13 in order to provide an effective anti-rotational lamp assembly.

When housing 14 is inserted into grommet 13, lens 22 is completely rearward of the front surface of annular flange 34. By constructing and arranging assembly 10 in this manner, lens 22 is protected when the vehicle strikes a loading dock, or the like, as the impact is first absorbed by grommet 13 which is formed from any conventional elastomeric material, such as a synthetic or natural rubber material. For example, grommet 13 may be formed from a polyvinyl chloride or other synthetic elastomeric material, such as Krayton available from Shell.

Accordingly, by constructing and arranging a vehicle lamp assembly in accordance with the invention, an effective anti-rotational assembly which may be installed with mounting hardware or fasteners is obtained. The assembly is easily constructed and installed and effectively prevents rotation of the lamp housing and grommet. Moreover, a housing formed in accordance with the invention may be installed in prior art grommets to provide improved anti-rotational results without the need to screw the available grommet into the mounting surface.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An anti-rotational vehicle lamp assembly for mounting in an opening in a wall comprising a substantially cylindrical elastomeric grommet having a front end and a back end and an opening therethrough, said grommet formed with a substantially cylindrical side wall adapted to be secured within a substantially circular opening in said wall, and a lamp housing formed from substantially cylindrical side wall and a lens forming the front surface of said housing, said housing formed with a plurality of radial ribs about the circumference of said housing side wall for compressively engaging the inner surface of said grommet side wall, the outside diameter of said housing along said ribs being greater than the inside diameter of said grommet side wall.

2. The assembly of claim 1, wherein said cylindrical side wall of said housing extends through said grommet wall opening and said housing ribs engage the inner surface of said grommet side wall at the back end thereof.

3. The assembly of claim 1, wherein said housing is formed with an outwardly extending peripheral flange means on the front of said housing side wall, said housing ribs being behind said flange means, said outwardly extending flange means compressed against the side wall of said grommet at a portion of said grommet adapted for making contact with said wall opening.

4. The assembly of claim 3, wherein said flange means is a flange formed with a forwardly extending axial cylindrical seating wall dimensioned to abut said grommet side wall at a portion of said grommet adapted for making contact with said wall opening.

5. The assembly of claim 4, wherein said grommet is formed further with a first outwardly extending peripheral flange at the front end of said side wall thereof, a second outwardly extending flange spaced apart from said first flange, and a plurality of radial ribs about the circumference of said side wall in the region between said flanges.

6. The assembly of claim 5, wherein said grommet side wall in the region between said flanges has a greater wall thickness than the back end thereof.

7. The assembly of claim 6, wherein said grommet has an inwardly extending flange at the back end thereof and a portion of said housing ribs abut said inwardly extending flange.

8. The assembly of claim 5, wherein the inner surface of said grommet side wall is tapered inwardly in the front region proximate said grommet ribs.

9. The assembly of claim 5, wherein said first flange is formed with a rearwardly facing outer angular portion for making contact with a surface of a wall in which said assembly is mounted.

10. An improved anti-rotational vehicle lamp housing having a substantially cylindrical side wall for assembly in cooperation with an elastomeric grommet having a substantially cylindrical side wall for mounting in a circular opening in a mounting surface, the improvement which comprises providing a plurality of radial ribs on the circumference of said side wall of said housing, said ribs adapted to engage an inner surface of said side wall of said grommet.

* * * * *